US007519472B1

(12) United States Patent
Grigsby et al.

(10) Patent No.: US 7,519,472 B1

(45) Date of Patent: Apr. 14, 2009

(54) INFERRING STATIC TRAFFIC ARTIFACT PRESENCE, LOCATION, AND SPECIFICS FROM AGGREGATED NAVIGATION SYSTEM DATA

(75) Inventors: Travis M. Grigsby, Austin, TX (US); Steven M. Miller, Cary, NC (US); Daniel E. Morris, Round Rock, TX (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/120,883

(22) Filed: May 15, 2008

(51) Int. Cl.
*G01C 21/00* (2006.01)
*G06F 19/00* (2006.01)
*G08G 1/123* (2006.01)

(52) U.S. Cl. ...................... 701/213; 701/116; 701/117; 701/118; 701/200; 701/207; 340/995.13; 340/909; 340/917; 340/919; 342/357.13; 342/454; 342/457

(58) Field of Classification Search ......... 701/116–118, 701/200, 207, 213; 340/995, 995.13, 909, 340/917, 919, 920, 922; 342/357.13, 454, 342/457
See application file for complete search history.

(56) References Cited

U.S. PATENT DOCUMENTS 5,177,685 A 1/1993 Davis et al.
5,539,645 A * 7/1996 Mandhyan et al. .......... 701/119
6,047,234 A 4/2000 Cherveny et al.
6,338,021 B1 1/2002 Yagyu et al.
6,362,730 B2 3/2002 Razavi et al.
6,381,537 B1 4/2002 Chenault et al.
6,516,267 B1 2/2003 Cherveny et al.
6,526,349 B2 2/2003 Bullock et al.
6,542,808 B2 4/2003 Mintz
6,577,946 B2 6/2003 Myr
6,609,064 B1 * 8/2003 Dean .......................... 701/213
6,813,545 B2 11/2004 Stromme
6,853,913 B2 2/2005 Cherveny et al.
7,113,110 B2 9/2006 Horstemeyer (Continued)

FOREIGN PATENT DOCUMENTS

EP 13830981 5/2006

(Continued)

*Primary Examiner*—Jack Keith
*Assistant Examiner*—Chuong P Nguyen
(74) *Attorney, Agent, or Firm*—Patents on Demand, PA; Brian K. Buchheit

(57) ABSTRACT

Aggregated navigation system data can be used by an artifact repository to infer the presence of a static traffic artifact. Static traffic artifact can include traffic lights, traffic signs, special traffic zones, railroad crossings, and the like. Metric data collected from multiple global positioning systems (GPS) devices can provide sampling data for inferring a static traffic artifact on a road. Metrics can include driving behavior, travel direction, velocity, timestamps, delay, and the like. For example, if thirty percent of the data collected about an intersection indicates drivers come to a stop at an intersection, the system can infer a traffic light exists at the intersection. Each traffic artifact can have an associated confidence factor which can indicate the degree of accuracy of the inferred artifact. Confidence factor can be increased or decreased based on the re-evaluation of sample data for the artifact.

20 Claims, 4 Drawing Sheets

100

U.S. PATENT DOCUMENTS

| | | | | |
|---|---|---|---|---|
| 7,389,178 | B2 | 6/2008 | Raz et al. | |
| 2003/0195696 | A1 | 10/2003 | Jones | |
| 2007/0027583 | A1 * | 2/2007 | Tamir et al. | 701/1 |
| 2007/0038360 | A1 | 2/2007 | Sakhpara | |
| 2007/0208492 | A1 | 9/2007 | Downs et al. | |
| 2007/0208493 | A1 | 9/2007 | Downs et al. | |
| 2007/0208494 | A1 | 9/2007 | Chapman et al. | |
| 2007/0208495 | A1 | 9/2007 | Chapman et al. | |
| 2007/0208496 | A1 | 9/2007 | Downs et al. | |
| 2007/0208497 | A1 | 9/2007 | Downs et al. | |
| 2007/0208498 | A1 | 9/2007 | Barker et al. | |
| 2007/0208501 | A1 | 9/2007 | Downs et al. | |
| 2008/0004794 | A1 | 1/2008 | Horvitz | |
| 2008/0022414 | A1 | 1/2008 | Cahn et al. | |
| 2008/0046166 | A1 | 2/2008 | Fakler et al. | |
| 2008/0071465 | A1 * | 3/2008 | Chapman et al. | 701/117 |
| 2008/0071466 | A1 | 3/2008 | Downs et al. | |

FOREIGN PATENT DOCUMENTS

| | | |
|---|---|---|
| EP | 1909231 | 4/2008 |

* cited by examiner

| Location | Speed (mph) | Timestamp |
|---|---|---|
| 242 | 65 | 01:05:33 |
| 244 | 0 | 01:08:50 |
| 260 | 50 | 01:15:12 |

INFERRING STATIC TRAFFIC ARTIFACT PRESENCE, LOCATION, AND SPECIFICS FROM AGGREGATED NAVIGATION SYSTEM DATA

BACKGROUND OF THE INVENTION

The present invention relates to the field of navigation services and, more particularly, to inferring static traffic artifact presence, location, and specifics from aggregated navigation system data.

Global positioning system (GPS) navigation devices have become an indispensable tool for many drivers today. They can provide a variety of services, from assisting in plotting routes and showing traffic jams to presenting points of interest. However, these capabilities do not account for a large number of potential tribulations drivers encounter on the road. Drivers can often get stopped at traffic lights with long time cycles, resulting in frustration and even tardiness in arriving at a destination. Further, construction zones can be problematic when drivers are in a rush to reach their destination.

Navigation devices unable to account for such artifacts can present misleading routing assistance. For example, a long route with a four traffic lights can be a quicker journey for the driver than a shorter route with a three traffic lights. Further, school zones can be problematic for many drivers. Drivers passing through an active school zone at non-reduced speeds can endanger schoolchildren and potentially be ticketed. As such some drivers would chose to avoid traffic lights, school zones, railroad crossings, etc. Currently there is no solution which provides assistance to drivers in eliminating possible troubles on the road.

SUMMARY OF THE INVENTION

A solution comprising a method, computer program product, and system for utilizing data from a set of global position system (GPS) equipped devices to determine static traffic artifact specifics. In the solution, session data can be received from a set of mobile global position system devices. An existence, position, and type of a set of static traffic artifacts can be inferred based upon the received session data. Geographic information used for vehicle navigation purposes can be updated to include the inferred static traffic artifacts. The inferred static traffic artifacts can include stop signs, traffic lights, school zones, railroad crossings, cross walks, and/or drawbridges. A direction relative to traffic flow can be inferred for each of the stop signs based upon the received session data. A cycle of the traffic lights in each direction relative to traffic flow can be determined based upon the received session data. At least a portion of the mobile global position system devices can include a network transceiver. Session data can be received over a network, which is transmitted by a set of the network transceivers. Inferred static traffic artifacts can be conveyed to at least a portion of the mobile global position system devices. The mobile global position system device can be configured to present visual artifacts for the static traffic artifacts upon a user interface.

In one embodiment, at least one inferred static traffic artifact for which additional data is needed can be identified. An inquiry for additional information concerning the identified traffic artifact can be generated. The inquiry can be conveyed to a set of the mobile global position system devices. Responses to the inquiry can be received from at least a portion of the mobile global position system devices. Data regarding the identified traffic artifact can be adjusted based upon the received responses.

In one embodiment, the session data received from each of the set of mobile global position system devices can represents metrics captured by the global position system devices regarding travel details of a vehicle along a travel path. The travel details can include a set of points at which the vehicle stopped moving, a duration for which the vehicle was stopped, and data concerning a travel direction along the travel path when each stop occurred.

When the solution is implemented within a computer program product, the computer program product can include a computer usable medium having computer usable program code embodied therewith. The computer usable program code can be configured to cause a machine to perform each of the actions of the solution in accordance with programmatic instructions of the computer usable program code.

When the solution is implemented within a system, the system can include a bus, a memory connected to the bus, and a processor. The memory can be configured to contain a set of instructions. The processor can be connected to the bus. The processor can be operable to execute the instructions of the memory, which results in the processor performing each of the actions of the solution.

DETAILED DESCRIPTION OF THE INVENTION

Figure 1:
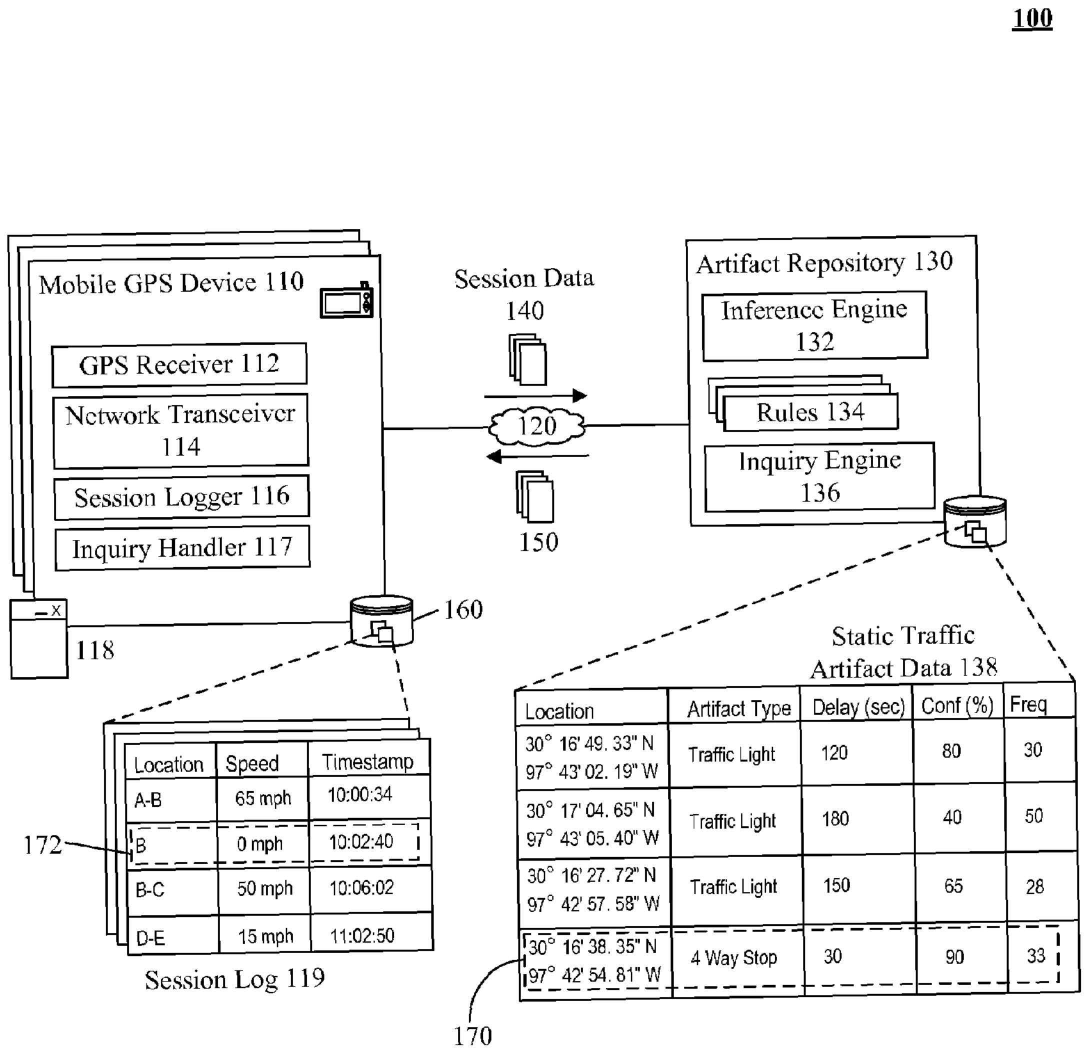
FIG. 1 is a schematic diagram illustrating a system for utilizing aggregated metric data from mobile global positioning system (GPS) devices to infer static traffic artifacts on a roadway in accordance with an embodiment of the inventive arrangements disclosed herein.

The present invention discloses a solution for inferring static traffic artifact presence, location, and specifics from aggregated navigation system data. In the solution, aggregated navigation system data can be used by an artifact repository to infer the presence of a static traffic artifact. Static traffic artifact can include traffic lights, traffic signs, special traffic zones, railroad crossings, and the like. Metric data collected from multiple global positioning systems (GPS) devices can provide sampling data for inferring a static traffic artifact on a road. Metrics can include driving behavior, travel direction, velocity, timestamps, delay, and the like. For example, if thirty percent of the data collected about an intersection indicates drivers come to a stop at an intersection, the system can infer a traffic light exists at the intersection. Each traffic artifact can have an associated confidence factor which can indicate the degree of accuracy of the inferred artifact. Confidence factor can be increased or decreased based on the re-evaluation of sample data for the artifact.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a system 100 for utilizing aggregated metric data from mobile global positioning system (GPS) devices to infer static traffic artifacts on a roadway in accordance with an embodiment of the inventive arrangements disclosed herein. In system 100, multiple mobile GPS devices 110, such as car GPS navigation systems, can record driving data which can be conveyed to a repository 130 as session data 140. Session data 140 can be used as metrics by repository 130 to infer static traffic artifacts on roadways in a geographic region. Static traffic artifacts can include traffic lights, a traffic signs, special traffic zones, railroad crossings, drawbridges, and the like.

Device 110 can be mobile GPS navigation system able to log metric data about driving patterns, present traffic artifacts to a user, and respond to traffic artifact inquiries. Device 110 can include GPS receiver 112, network transceiver 114, session logger 116, inquiry handler 117, and interface 118. Device 110 can be a GPS receiver, GPS enabled navigation system, mobile phones with GPS capabilities, GPS equipped device, and the like.

In one embodiment, GPS device 110 can be a GPS receiver (e.g. GPS navigation system) within a vehicle. When GPS device 110 detects motion, session logger 116 can record various metrics in a session log 119. Metrics can be determined by GPS receiver 112 which can include geographic location, direction of motion, velocity, acceleration, stoppage, and the like. Collected data in session log 119 can be stored in local data store 160. Portions of a traveling session can be stored in segments based on speed changes, stoppages, direction changes, and the like. For example, device 110 in a vehicle can record trip details from a starting point A to a destination point C, noting the speed, time, geographic location, and direction of motion.

Session data 140 can be conveyed to artifact repository 130 over network 120 using network transceiver 114. Network 120 can include any combination of wired and wireless technology, a private network, a public network, cellular network, the Internet, and the like. For example, when device 110 detects a driver's home network, device 110 can be connect and transmit session data 120 to repository 130. When connected to network 120, traffic artifact data 138 can be communicated to device 110 in the form of an update. The update can include a cartographic database update, data set update, software patch, package update, and the like.

In one embodiment, session data 140 can be conveyed from the device 110 to an external device, which is connected to network 120. In such an embodiment, the device 110 may not include a network transceiver 114, since the external device is used to convey session data 140 over network 120 to repository 130. For example, a removable memory containing session data 140 can be physically conveyed from device 110 to an external device, which is connected to network 120. In another example, the device 110 can be communicatively linked (e.g., USB connection, WIFI connection, BLUETOOTH connection, etc.) to an external device, which is in turn connected to network 120.

Session data 140 collected from one or more devices 110 can be processed by device, geographic location, and the like. Inference engine 132 can be used to process session data 140 based on a set of rules 134. Processing can result in static traffic artifacts being inferred based on patterns in data 140. Inferred artifacts and associated specifics can be stored in repository 130 as static traffic artifact data 138. Data 138 can be modified when new session data 140 becomes available.

Inference engine 132 can process session data 140 to determine the probability and type of a static traffic artifact at a geographic location. The artifact can be partly determined based on driving patterns and behaviors present in session data 140. Using rules 134, metrics in session data 140 can be assigned weights which represent strong correlations to specific types of traffic artifacts. For example, in entry 172 location B shows a complete stop of a vehicle. Multiple occurrences of stoppage at location B from several GPS devices 110 can result in inference engine 132 can determining a 4 way stop exists at the location B. Other patterns can be used to detect artifacts such as speeding up to "beat a traffic light", stopping for a duration of time then performing a turn, making U-turns, and the like. Inferred traffic artifacts can be stored in table 138. Each artifact stored in table 138 can include information such as specific geographic location, artifact type, delay information, confidence factor, sampling frequency, and the like.

Each evaluation of a behavior obtained from session data 140 for a location can increase or decrease the confidence value for the artifact. The confidence factor can represent the probability the traffic artifact exists at a given geographic location. For example, the inference engine can determine with 90% certainty that a 4 way stop exists at the location shown in entry 170. Additionally, the factor can be a calculated aggregate value indicating the accuracy of stored specifics for the artifact. When an artifact cannot be determined for a location because of a data deficiency, the artifact can be flagged for future evaluation. Further, threshold values can be set using rules 134 to indicate additional data is required to accurately infer a traffic artifact. Artifacts that fall below this threshold value can be flagged for evaluation when data is available.

Additional data can be obtained through artifact inquiries generated by engine 136. Based on session data 140, a geographic region the device 110 can provide data for can be determined. Devices 110 with an abundance of data for a geographic region can be indexed and stored by engine 136 in a list of potential data sources. This list can be utilized to generate inquiries to the devices 110 most likely to provide the requested data. Inquiries can include one or more requests for metrics for a location from GPS devices 110 based on the determined geographic region. Inquiry 150 can be conveyed to devices 110 which can utilize inquiry handler 117 to process and to respond to the inquiry 150.

Inquiry handler 117 can select data for the geographic location from session log 119. When requested data is not available, inquiry handler 117 can store inquiries until metric data is obtained for the given location. Responses to inquiry 150 can be conveyed to repository 130 over network 120.

Artifact data 138 can be communicated to devices 110 which can store inferred static traffic artifact data 138 locally in data store 160. Locally stored artifact data can be utilized by mobile GPS device 110 to present a driver with artifact presence and details in interface 118. For example, data can be used to notify the driver of possible upcoming traffic artifacts that requires the driver's attention. In another instance, artifact data can be used by device 110 to choose routes based on a driver specified start and destination point. For example, when determining the fastest route, routes with 4 way stops can be favored over routes with traffic lights.

Drawings of the present invention are for illustrative purposes only and should not be construed to limit the invention in any regard. Implementation details of system 100 can vary and components presented in system 100 can be optional. For example, in one embodiment, device 110 can be a GPS equipped thin client, where functions of components shown in system 100 (e.g., components 116, 117, 160) are performed by a network element communicatively linked to the thin client. In another embodiment, components illustrated as being contained in repository 130, can be distributed across a plurality of components linked to network. Communication between repository 130 and devices 110 can be asynchronous and is not limited to real-time or near real-time communication. Interaction between repository 130 and devices 110 can be organized in a push/pull structure, a subscribe/publish interaction, and the like.

Figure 2:
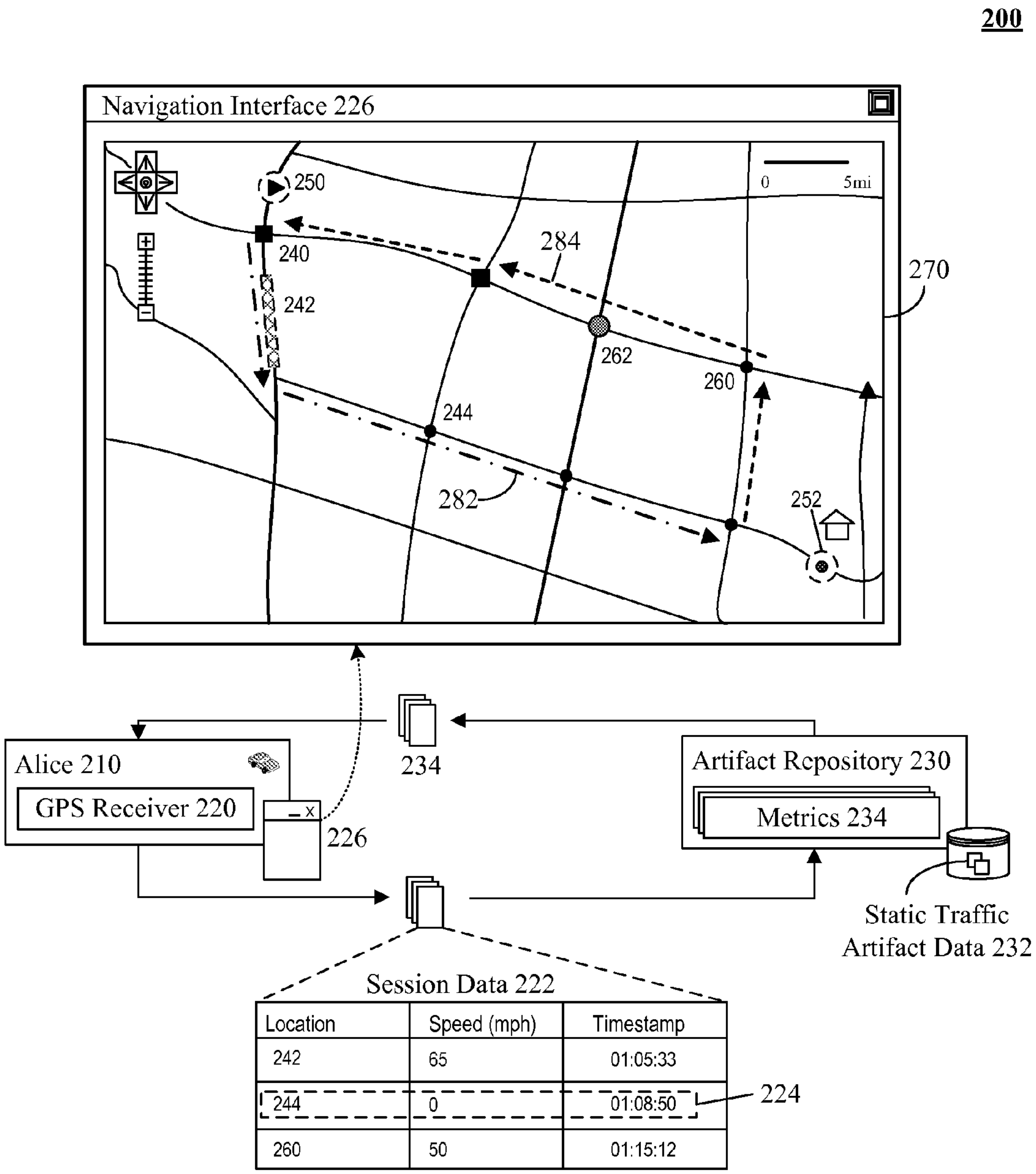
FIG. 2 is a schematic diagram illustrating a scenario for generating metric data and evaluating metrics for inferring static traffic artifacts in accordance with an embodiment of the inventive arrangements disclosed herein.

FIG. 2 is a schematic diagram illustrating a scenario 200 for generating metric data and evaluating metrics for inferring static traffic artifacts in accordance with an embodiment of the inventive arrangements disclosed herein. Scenario 200 can be performed in the context of system 100. In scenario 200, Alice 210 can be aided during a journey along route 282 by a GPS equipped vehicle. GPS receiver 220 can collect metric data useful in generating metrics 234. Metrics 234 can be used to infer static traffic artifact data 232 for roadways in a geographic region. Appropriate region data 232 can be conveyed to receiver 220 which can be presented to Alice 210 in interface 226 overlaid on map 270.

GPS receiver 220 can record Alice's speed, direction of travel, time of departure, and other relevant information for route 282. This information can be polled at regular intervals (e.g. every 3 seconds) which can be user configured. Alice's 210 journey can begin at point 250 and continue to point 240. At 240, Alice 210 can encounter a 4-way stop. The receiver 220 can record the specifics of the stop such as stopping time, resume time, and the like. Threshold values for vehicle stopping can be configured in receiver 220 to account for "rolling stops", intermittent braking, and the like.

Alice 210 can encounter construction zone 242 which can be a speed restricted zone at specific intervals during the day. At the time Alice 210 drives through zone 242, construction can occur resulting in Alice's 210 speed being reduced. This speed reduction can be recorded in session data 222 and aggregated into metrics 234. For instance, metrics 234 can indicate zone 242 is a speed restricted zone during some of the day, while other metrics can the zone is not during other portions of the day. Evaluation of these metrics 234 can result in repository 230 inferring the times and days which the construction zone is a speed restricted zone. At intersection 244, Alice 210 can be stopped at a traffic light. The timestamp of the stop as shown in entry 224 can be utilized along with other metrics 234 to determine the average length of the traffic light cycle.

When Alice 210 reaches destination point 252 (e.g. home), session data 222 can be conveyed to artifact repository 230 over Alice's 210 home network. Repository can process session data 222 along with other aggregated data to establish, verify, or dismiss the probability of a traffic artifact at a geographic location. Newly inferred static traffic artifact data 234 for the region 270 can be conveyed from repository 230 to GPS receiver. New data can include traffic artifact data for route 284.

Alice 210 traveling along route 284 can be assisted by artifact data 234 presented on map 270 via interface 226. Before approaching traffic light 260, Alice 210 can be notified by receiver 226. Traffic artifacts 262 without sufficient data to create strong inferences can be presented in a different manner. For example, artifact 262 can be presented as circle with grey fill instead of a solid black circle.

Figure 3:
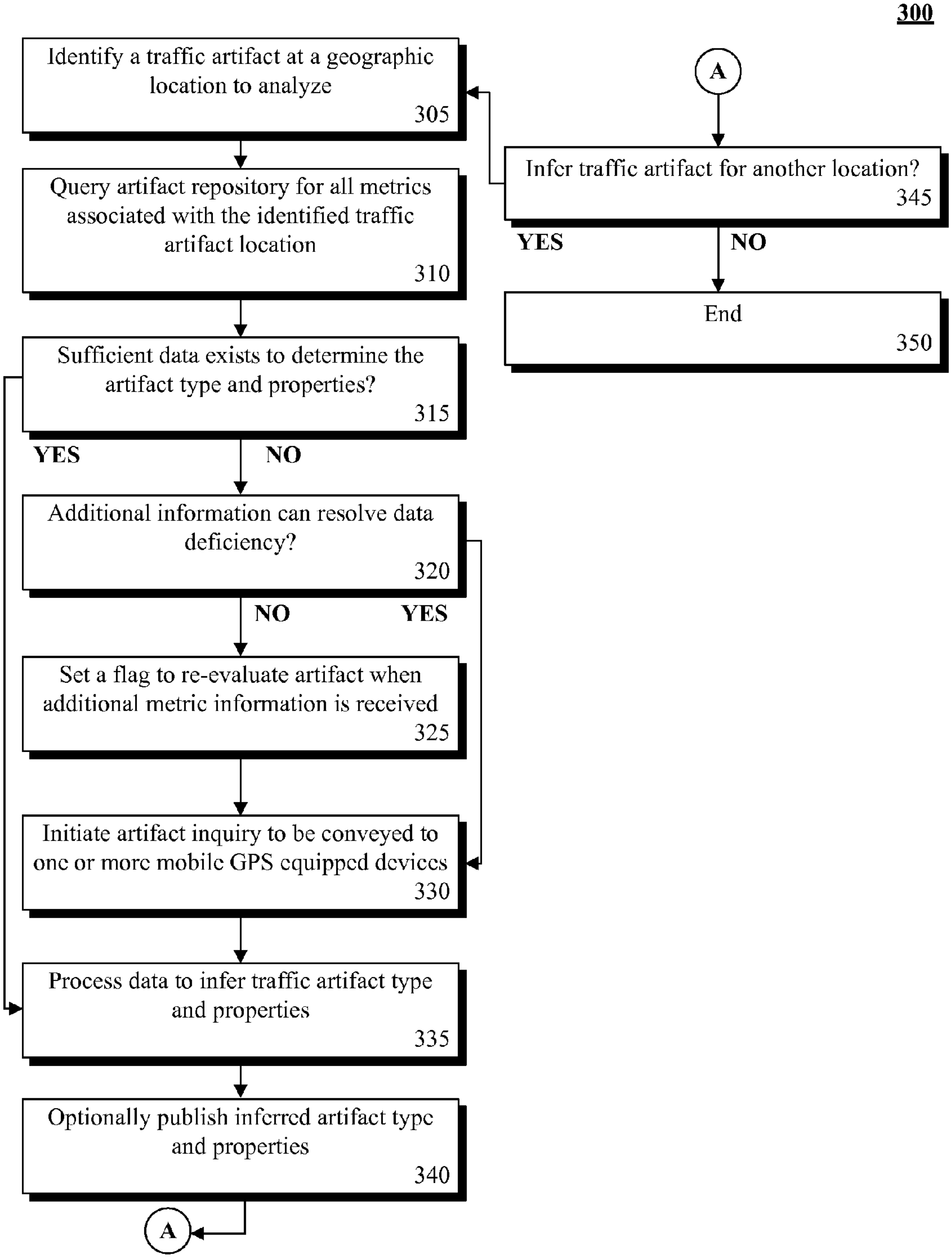
FIG. 3 is a flowchart illustrating a method for inferring static traffic artifacts from data aggregated from multiple mobile GPS navigation systems in accordance with an embodiment of the inventive arrangements disclosed herein.

FIG. 3 is a flowchart illustrating a method 300 for inferring static traffic artifacts from data aggregated from multiple mobile GPS navigation systems in accordance with an embodiment of the inventive arrangements disclosed herein. Method 300 can be performed in the context of system 100. In method 300, one or more static traffic artifacts can be inferred for an identified geographic location. The method can attempt to predict the presence, location, and specifics of a static traffic artifact on a roadway.

In step 305, the method can identify a traffic artifact at a geographic location to analyze. This action can be the result of a GPS receiver query, receipt of new metric data, timed programmatic action, and the like. In step 310, an artifact repository can be queried for all metrics associated with the identified traffic artifact. In step 315, if sufficient data exists to determine the artifact type and properties, the method can proceed to step 335, else continue to step 320. In step 320, if any additional information can resolve the data deficiency, the method can proceed to step 330, else continue to step 325. In step 325, a flag can be set to trigger the repository to re-evaluate the artifact when additional metric information is received. The flag can be an indicator associated with a specific artifact, location, artifact type, and the like.

In step 330, the method can initiate an artifact inquiry to be conveyed to one or more mobile GPS equipped devices. This inquiry can invoke metric gathering process 405, resulting in metric data being conveyed to the repository from responding GPS devices. In step 335, data can be processed to infer traffic artifact type and properties. Properties can include traffic light timing data, speed restrictions, time periods, scheduling data, and the like. For example, the time period for which a school zone is active can be determined and stored with the associated traffic artifact such as speed restriction data. In step 340, the inferred artifact data can be optionally published for subscribers (e.g., GPS car navigation systems) to consume. In step 345, if there are more traffic artifacts to infer, the method can return to step 305, else the method can proceed to step 350. In step 350, the method can terminate until an artifact inquiry or additional metric data is received.

Figure 4:
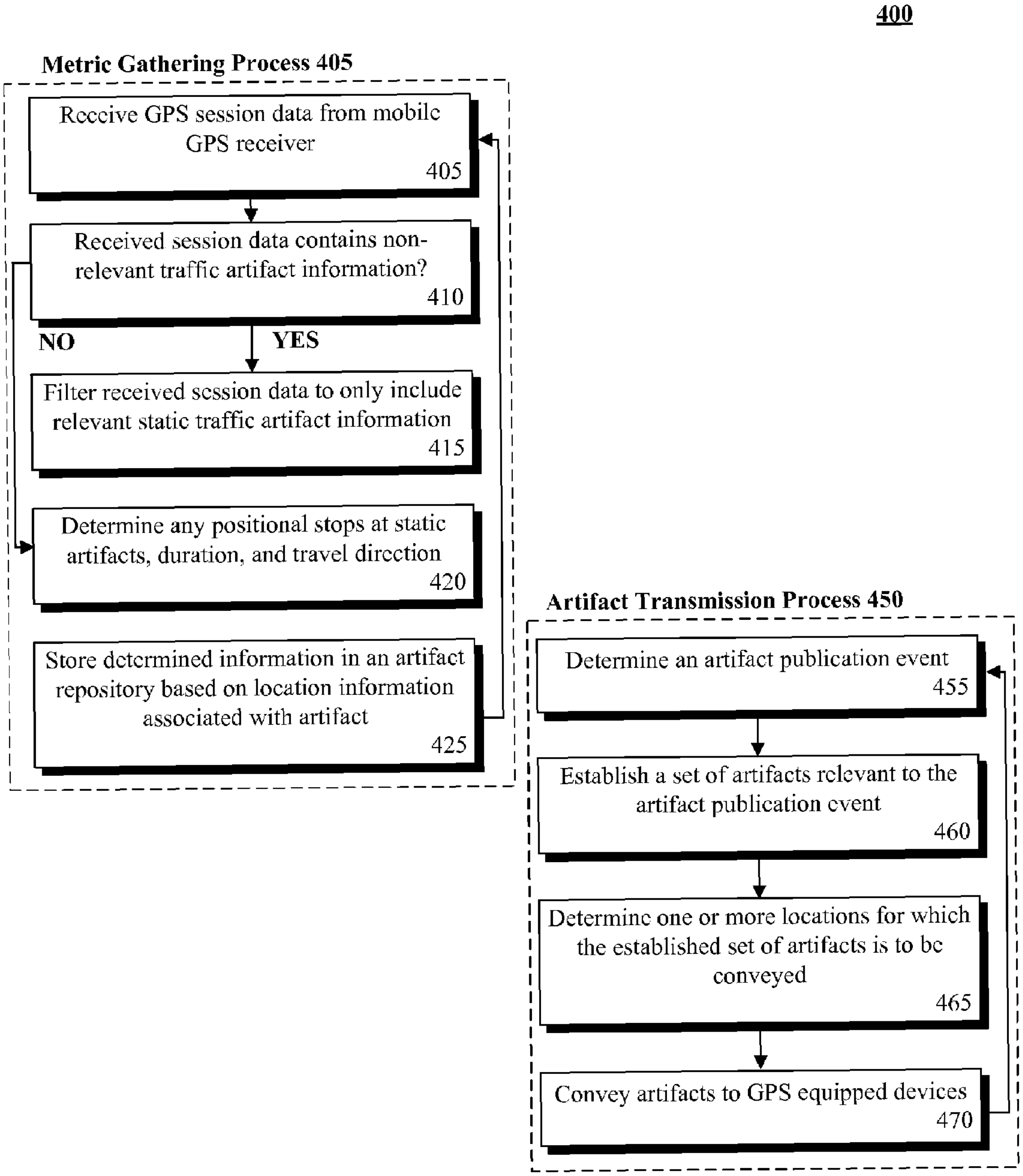
FIG. 4 is a flowchart illustrating a metric gathering process and an artifact transmission process for a system able to infer static traffic artifacts on a roadway in accordance with an embodiment of the inventive arrangements disclosed herein.

FIG. 4 is a flowchart illustrating a metric gathering process 405 and an artifact transmission process 450 for a system able to infer static traffic artifacts on a roadway in accordance with an embodiment of the inventive arrangements disclosed herein. Processes 405, 450 can be performed in the context of system 100 and method 300. In method 405, metric data can be collected from multiple global positioning system (GPS) receivers to infer a static traffic artifact at a geographic location. Inferred traffic artifacts can be relayed to GPS receivers using method 450. In method 450, traffic artifacts can be conveyed to GPS receivers based on a geographic location. As used herein, GPS receivers can include mobile GPS enabled navigation systems, mobile phones with GPS capabilities, GPS equipped devices, and the like.

In step 405, an artifact repository can receive GPS session data from a mobile GPS receiver. Session data can be queried for by artifact repository published by the GPS receiver. In step 410, if received session data contains non-relevant traffic artifact information, the method can continue to step 415, else proceed to step 420. In step 415, the repository can filter received session data to only include relevant static traffic artifact information. In step 420, the repository can determine if any positional stops at artifacts occurred, the duration, and the travel direction. In step 425, the determined information can be stored in the repository based on location associated with the artifact.

In step 455, an artifact publication event is detected. The publication event can be triggered by a GPS receiver inquiry, a detected change in artifact specifics, or method 300 initiating an artifact inquiry. In step 460, a set of artifacts relevant to the artifact publication can be established. In step 465, one or more locations can be determined for the established set of artifacts to be conveyed. In step 470, artifacts can be conveyed to GPS equipped devices.

The diagrams in FIGS. 1-4 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for utilizing data from a plurality of global position system (GPS) equipped devices to determine static traffic artifact specifics comprising:

providing a navigation database common to a plurality of users;

receiving GPS session data from a plurality of mobile global position system devices;

using the received GPS session data from said plurality of mobile global position system devices to infer an existence, position, and type of a plurality of static traffic artifacts based only upon the received GPS session data; and updating geographic information in the navigation database used for vehicle navigation purposes to include the inferred static traffic artifacts.

2. The method of claim 1, wherein said inferred static traffic artifacts comprise stop signs and traffic lights.

3. The method of claim 2, wherein the static traffic artifacts comprise stop signs, said method further comprising:

inferring a direction relative to traffic flow for each of the stop signs based upon the received GPS session data.

4. The method of claim 2, wherein the static traffic artifacts comprise traffic lights, said method further comprising:

determining a cycle of said traffic lights in each direction relative to traffic flow based upon the received GPS session data.

5. The method of claim 2, wherein the inferred static traffic artifacts further comprise school zones, railroad crossings, cross walks and drawbridges.

6. The method of claim 1, wherein at least one of said mobile global position system devices comprise a network transceiver, said method further comprising:

receiving GPS session data over a network, which is transmitted by a plurality of said network transceivers.

7. The method of claim 1, further comprising:

conveying said inferred static traffic artifacts to at least one of the mobile global position system devices, wherein said mobile global position system device are configured to present visual artifacts for the static traffic artifacts upon a user interface.

8. The method of claim 1, further comprising:

identifying at least one inferred static traffic artifact for which additional data is needed;

generating an inquiry for additional information concerning the identified traffic artifact;

conveying the inquiry to a plurality of the mobile global position system devices;

receiving responses to the inquiry from at least one of the mobile global position system devices; and adjusting data regarding the identified traffic artifact based upon the received responses.

9. The method of claim 1, wherein the GPS session data received from each of the plurality of mobile global position system devices represents metrics captured by the global position system devices regarding travel details of a vehicle along a travel path, wherein said travel details comprise a plurality of points at which the vehicle stopped moving, a duration for which the vehicle was stopped, and data concerning a travel direction along the travel path when each stop occurred.

10. A computer program product for utilizing data from a plurality of global position system (GPS) equipped devices to determine static traffic artifact specifics, the computer program product being stored in a storage medium having computer usable program code embodied therewith, the computer program product comprising:

computer usable program code configured to provide a navigation database common to a plurality of users;

computer usable program code configured to receive GPS session data from a plurality of mobile global position system devices;

computer usable program code configured to use the received GPS session data from said plurality of mobile global position system devices to infer an existence, position, and type of a plurality of static traffic artifacts based only upon the received GPS session data; and computer usable program code configured to update geographic information in the navigation database used for vehicle navigation purposes to include the inferred static traffic artifacts.

11. The computer program product of claim 10, wherein said inferred static traffic artifacts comprise stop signs and traffic lights.

12. The computer program product of claim 11, wherein the static traffic artifacts comprise stop signs, said computer program product further comprising:

computer usable program code configured to infer a direction relative to traffic flow for each of the stop signs based upon the received GPS session data.

13. The computer program product of claim 11, wherein the static traffic artifacts comprise traffic lights, said computer program product further comprising:

computer usable program code configured to determine a cycle of said traffic lights in each direction relative to traffic flow based upon the received GPS session data.

14. The computer program product of claim 11, wherein the inferred static traffic artifacts further comprise school zones, railroad crossings, and drawbridges.

15. The computer program product of claim 10, wherein at least one of said mobile global position system devices comprise a network transceiver, said computer program product further comprising:

computer usable program code configured to receive session data over a network, which is transmitted by a plurality of said network transceivers.

16. The computer program product of claim 10, further comprising:

computer usable program code configured to convey said inferred static traffic artifacts to at least one of the mobile global position system devices, wherein said mobile global position system device are configured to present visual artifacts for the static traffic artifacts upon a user interface.

17. The computer program product of claim 10, further comprising:

identifying at least one inferred static traffic artifact for which additional data is needed;

computer usable program code configured to generate an inquiry for additional information concerning the identified traffic artifact;

computer usable program code configured to convey the inquiry to a plurality of the mobile global position system devices;

computer usable program code configured to receive responses to the inquiry from at least one of the mobile global position system devices; and computer usable program code configured to adjust data regarding the identified traffic artifact based upon the received responses.

18. The computer program product of claim 10, wherein the GPS session data received from each of the plurality of mobile global position system devices represents metrics captured by the global position system devices regarding travel details of a vehicle along a travel path, wherein said travel details comprise a plurality of points at which the vehicle stopped moving, a duration for which the vehicle was stopped, and data concerning a travel direction along the travel path when each stop occurred.

19. A system for utilizing data from a plurality of global position system (GPS) equipped devices to determine static traffic artifact specifics comprising:

a bus;

a memory connected to the bus, wherein the memory contains a set of instructions; and a processor connected to the bus, wherein the processor is operable to execute the instructions, wherein said processor is configured to provide a navigation database common to a plurality of users; to receive GPS session data from a plurality of mobile global position system devices; to use the received GPS session data from said plurality of mobile global position system devices to infer an existence, position, and type of a plurality of static traffic artifacts based only upon GPS session data; and to update geographic information in the navigation database used for vehicle navigation purposes to include the inferred static traffic artifacts.

20. The system of claim 19, wherein the GPS session data received from each of the plurality of mobile global position system devices represents metrics captured by the global position system devices regarding travel details of a vehicle along a travel path, wherein said travel details comprise a plurality of points at which the vehicle stopped moving, a duration for which the vehicle was stopped, and data concerning a travel direction along the travel path when each stop occurred.

* * * * *